E. N. ARNSPIGER.
AUTOMOBILE WHEEL HUB.
APPLICATION FILED JAN. 26, 1918.
1,300,807.
Patented Apr. 15, 1919.
2 SHEETS—SHEET 2.
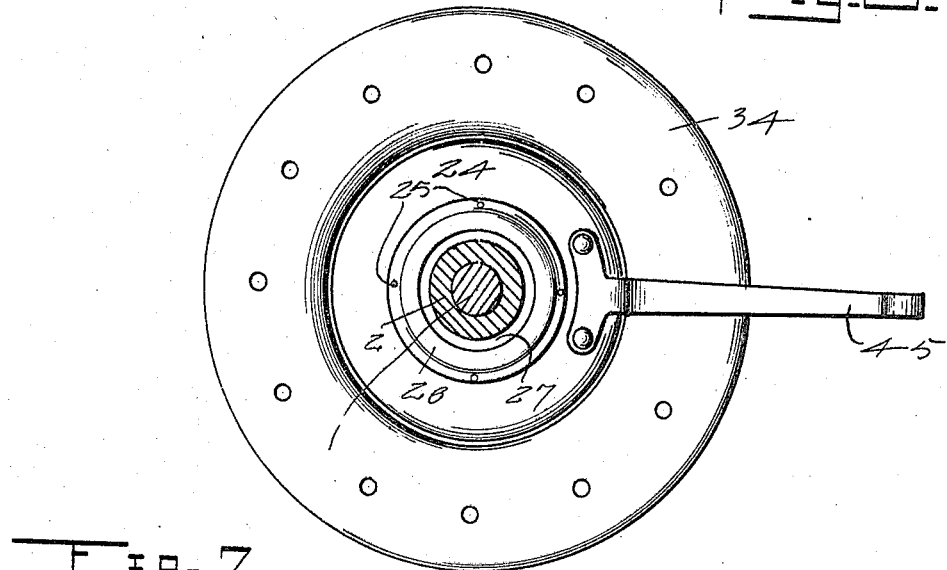
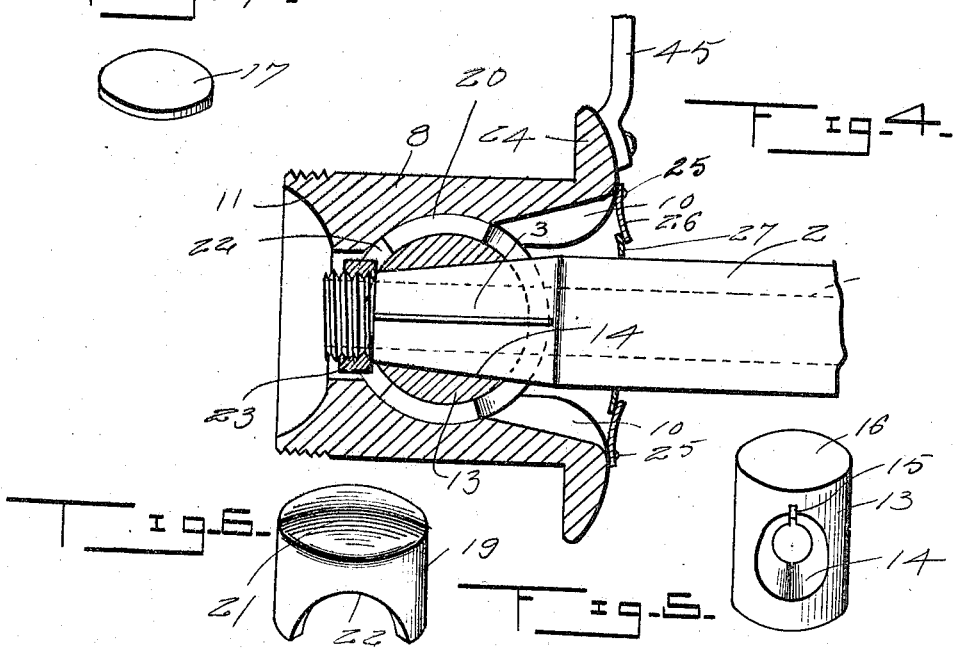
Witnesses
Inventor
E. N. Arnspiger,
By
Attorney

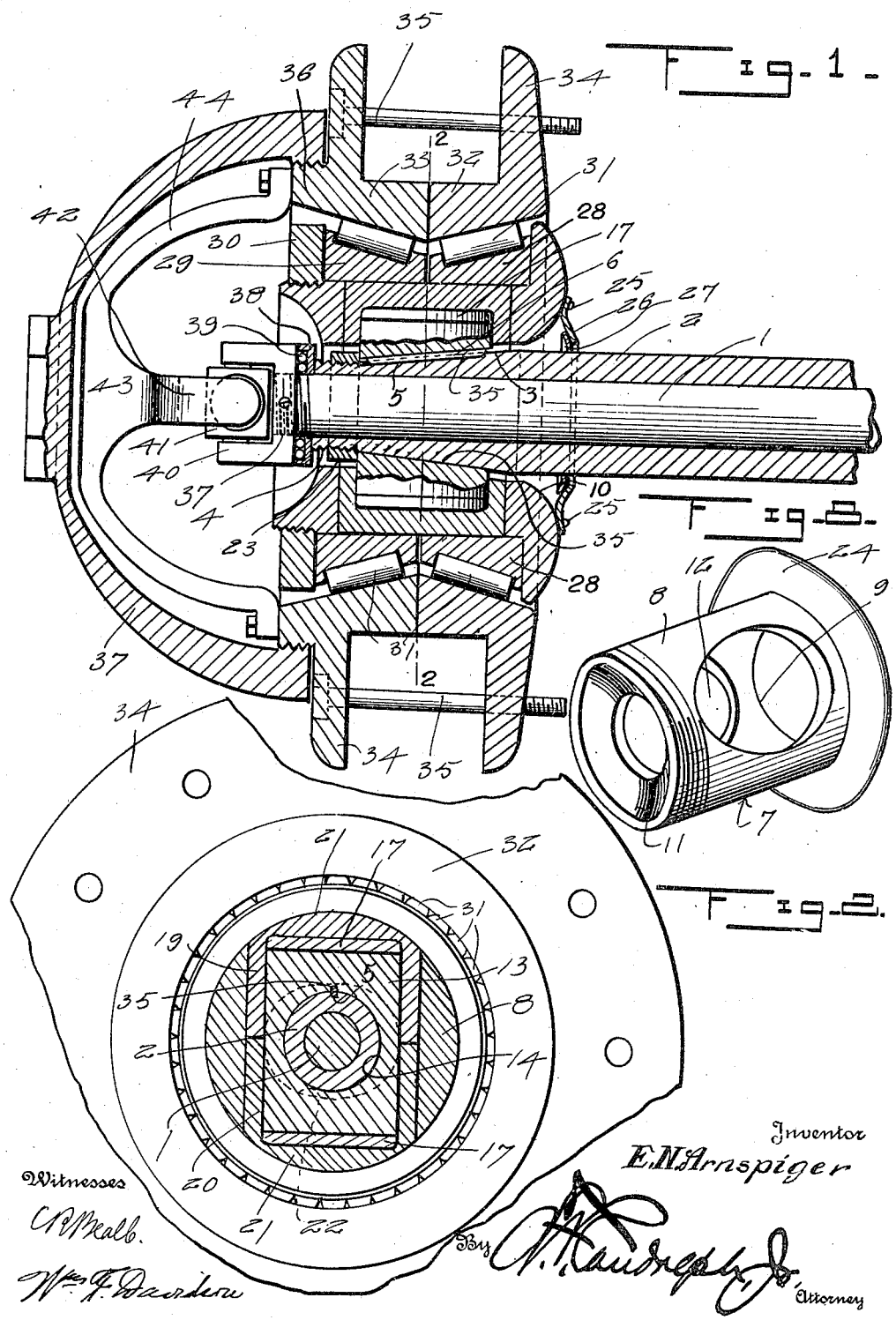

UNITED STATES PATENT OFFICE.

EUGENE N. ARNSPIGER, OF CHICAGO, ILLINOIS.

AUTOMOBILE-WHEEL HUB.

1,300,807.                Specification of Letters Patent.        Patented Apr. 15, 1919.

Application filed January 26, 1918.    Serial No. 213,946.

*To all whom it may concern:*

Be it known that I, EUGENE N. ARN-SPIGER, a citizen of the United States, residing at Chicago, in the county of Cook and State of Illinois, have invented certain new and useful Improvements in Automobile Wheel-Hubs; and I do hereby declare the following to be a full, clear, and exact description of the invention, such as will enable others skilled in the art to which it appertains to make and use the same.

This invention relates to improvements in automobile wheel hubs, and has for one of its objects the provision of a device of this character whereby a continuous axle may be used or the usual steering knuckles of an axle may be obviated.

Another object of this invention is the provision of means for permitting the hub to turn about a vertical axis while at the same time free to rotate on the horizontal axle.

A further object of this invention is the provision of a driving connection between the axle and hub which will permit the hub to turn about a vertical axis, so that the wheel of the hub may be steered.

A still further object of this invention is the provision of an automobile wheel hub of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a vertical sectional view of an automobile wheel hub constructed in accordance with my invention.

Fig. 2 is a transverse sectional view of the same taken on the line 2—2 of Fig. 1.

Fig. 3 is an end elevation partly in section of the hub.

Fig. 4 is a fragmentary sectional view of the bearing member of the hub mounted upon the axle.

Fig. 5 is a perspective view of a cylindrical member forming a vertical axis for the hub to turn upon and which is secured to the axle.

Fig. 6 is a perspective view of a pair of members adapted to fit within the bearing member of the hub and upon the cylindrical member forming the vertical axis of the hub.

Fig. 7 is a perspective view of a wear disk, and

Fig. 8 is a perspective view of the bearing member of the hub.

Referring in detail to the drawings, the numeral 1 indicates a continuous or solid axle being mounted in an axle housing 2. The axle housing 2 is provided with a conical portion 3 forming a spindle on which the hub structure is mounted and its free end is screw threaded as illustrated at 4. The conical portion of the axle housing 2 is provided with a key slot 5 to receive a key 6.

A hub supporting or bearing member 7 consists of a cylindrical body portion 8 having its end 9 fully open for the purpose of receiving the axle housing 2 and at oppositely disposed points is cut away as illustrated at 10 to permit the hub supporting or bearing member to swing laterally in relation to the axle and the axle housing during the steering of the wheel. The other end of the cylindrical body 8 is partially closed by an end wall 11 and which is provided with its outer face beveled as clearly illustrated in Figs. 1 and 8. The cylindrical body 8 is provided with oppositely disposed openings 12 to receive a cylindrical member 13 which forms a vertical axis to the hub structure and which is provided with a conical shaped opening 14 to receive the conical shaped portion 3 of the axle housing 2 and is provided with a groove 15 for receiving the key 6, whereby the cylindrical member 13 is secured to the axle housing 2 and prevented from rotating thereon.

The cylindrical member 13 has its ends closed by end walls 16 on which are positioned washers 17. A bushing 18 is constructed from a pair of semi-cylindrical sections 19 and 20, each section having one end closed by a curved wall 21 while its opposite end is open and the wall adjacent thereto provided with oppositely disposed recesses 22, which recesses coöperate with each other in receiving the axle housing 2 when assembled. The sections 19 and 20 of the bushing 18 are positioned within the openings 12 of the hub bearing member 7 and rest and partly surround the member 13 as clearly illustrated in Fig. 1. The curved end walls 21 thereof conform to the contour of the curvature of the cylindrical body 8 of the supporting or bearing member 7. A lock nut 23 is threaded to the threaded end 4 of the axle housing 2 for retaining the member 13 thereon and which member retains the hub supporting or bearing member 7 upon the axle housing but which will permit said member to swing about a vertical axis.

The open end of the hub supporting or bearing member 7 is provided with an annular flange 24 to which is secured by fastening elements 25 a flexible ring 26 adapted to engage a collar 27 secured to the axle housing 2 for forming dust proof connection between the axle housing and the hub supporting or bearing member 7.

A pair of annular cones 28 and 29 are journaled upon the cylindrical body 8 of the hub bearing or supporting member 7 and the cone 28 bears against the flange 24 while the other cone bears against a lock nut or collar 30 threaded to the end of the cylindrical body 8. The outer peripheries of the cones 28 and 29 are inclined in opposite directions and recessed to receive roller bearings 31. A pair of hub rings 32 and 33 are mounted upon the roller bearings 31 and have annular flanges 34 formed upon their outer edges between which may be secured the ordinary spokes of a wheel by the bolts 35 and which bolts prevent the hub rings 32 and 33 from moving in relation to each other. The hub ring 33 has formed upon its outer edge a screw threaded extension 36 to which may be threaded the dust cap 37.

From the foregoing description it will be noted that the hub rings 32 and 33 may rotate freely about the cones 28 and 29 while the hub supporting or bearing member 7 may turn about a vertical axis, the member 13 acting as the vertical axis upon the axle.

A head 37 is formed upon the end of the axle 1 and is spaced from the end of the axle housing 2 to permit a thrust collar 38 to be positioned therebetween. Ball bearings 39 are positioned between the thrust collar 38 and the head 37 to form a thrust bearing for the axle. The head 37 is bifurcated to form a pair of relatively spaced arms 40 between which is pivoted a block 41. The block 41 has pivoted thereto bifurcated arms 42 carried or formed upon the web 43. The web 43 has formed thereon arcuate shaped arms 44 that are bolted or otherwise secured to the hub ring 33 whereby a driving connection is established between the hub rings and the axle 1. This structure provides means whereby a front drive may be had to the wheel and which wheel is capable of swinging about a vertical axis on the axle housings to permit steering of the wheel. A suitable arm 45 is secured to the flange 24 of the hub supporting or bearing member 7 to which the usual steering mechanism of an automobile may be connected.

While I have shown and described the preferred embodiment of my invention, it will be understood that minor changes in construction, combination, and arrangement of parts may be made without departing from the spirit and scope of the invention, as claimed.

Having thus described my invention, what I claim is:

1. An automobile hub comprising a cylindrical bearing member having oppositely disposed openings, a cylindrical member in said openings and having a tapered opening, an axle housing in said tapered opening of said cylindrical member, an axle in said axle housing, means securing the axle housing to the cylindrical member, sectional bushings located in the openings of the bearing member and receiving the upper and lower ends of the cylindrical member, and a hub structure rotatably mounted upon the bearing member.

2. An automobile hub comprising a cylindrical bearing member having opposite disposed openings, a concaved wall partially closing one end of said bearing member, a cylindrical member positioned within the oppositely disposed openings and having a tapered opening, an axle housing having a tapered portion disposed within the tapered opening of the cylindrical member and screw threaded, a lock nut threaded to said axle housing, means securing the cylindrical member to the axle housing, an axle in said axle housing, sectional bushings in the openings of the bearing member and receiving the upper and lower ends of the cylindrical member, and a hub structure rotatably mounted upon the bearing member.

In testimony whereof I affix my signature in presence of two witnesses.

EUGENE N. ARNSPIGER.

Witnesses:
FRANK J. SOLGER,
HENRY GARTMAN.